United States Patent
Ono (10) Patent No.: US 10,061,294 B2
(45) Date of Patent: Aug. 28, 2018

(54) NUMERICAL CONTROLLER PERFORMING SPEED CONTROL THAT SUPPRESSES EXCESSIVE POSITIONING DEVIATION

(71) Applicant: FANUC Corporation, Minamitsuru-gun, Yamanashi (JP)

(72) Inventor: Takenori Ono, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 208 days.

(21) Appl. No.: 15/019,023

(22) Filed: Feb. 9, 2016

(65) Prior Publication Data
US 2016/0246284 A1 Aug. 25, 2016

(30) Foreign Application Priority Data
Feb. 19, 2015 (JP) .................................. 2015-30794

(51) Int. Cl.
*G05B 19/40* (2006.01)
*G05B 19/404* (2006.01)

(52) U.S. Cl.
CPC .. *G05B 19/404* (2013.01); *G05B 2219/37506* (2013.01)

(58) Field of Classification Search
CPC .............. G05B 19/4061; G05B 19/404; G05B 19/4166; Y10T 408/65; Y10T 409/304704; Y10T 409/30504; Y10T 409/309352
See application file for complete search history.

(56) References Cited

U.S. PATENT DOCUMENTS

| | | | |
|---|---|---|---|
| 5,767,646 A * | 6/1998 | Matsumoto | G05B 19/4062 318/560 |
| 6,437,534 B1 * | 8/2002 | Kakino | G05B 19/4166 318/569 |
| 9,785,139 B2 * | 10/2017 | Oda | G05B 19/4166 |
| 9,851,709 B2 * | 12/2017 | Sato | G05B 19/19 |
| 2001/0012972 A1 * | 8/2001 | Matsumoto | G05B 19/4166 700/160 |

(Continued)

FOREIGN PATENT DOCUMENTS

| | | |
|---|---|---|
| JP | S64-31205 A | 2/1989 |
| JP | H01-308181 A | 12/1989 |

(Continued)

OTHER PUBLICATIONS

Decision to Grant a Patent issued Jan. 31, 2017 in Japanese Patent Application No. 2015-030794 (3 pages) with an English Translation (3 pages).

*Primary Examiner* — Robert Fennema
*Assistant Examiner* — Santosh R Poudel
(74) *Attorney, Agent, or Firm* — Drinker Biddle & Reath LLP (57) ABSTRACT

A numerical controller sets a parameter actually used for servo control on the basis of command data generated by analyzing a machining program. Based on the set parameter and a predefined allowable position deviation amount, a feed speed which is given by a position deviation not exceeding the predefined allowable position deviation amount is calculated. Then, when a feed speed commanded by the command data is larger than the calculated feed speed, the feed speed commanded by the command data is clamped at the calculated feed speed.

1 Claim, 4 Drawing Sheets

(56) References Cited

U.S. PATENT DOCUMENTS

| | | | | |
|---|---|---|---|---|
| 2004/0258495 | A1* | 12/2004 | Kakino | G05B 19/00 409/132 |
| 2008/0024083 | A1* | 1/2008 | Yamaguchi | G05B 19/4061 318/569 |
| 2010/0087948 | A1* | 4/2010 | Yamaguchi | G05B 19/4061 700/178 |
| 2012/0010745 | A1* | 1/2012 | Ide | G05B 19/4163 700/177 |
| 2012/0283851 | A1* | 11/2012 | Yamamoto | G05B 19/19 700/56 |
| 2013/0264988 | A1* | 10/2013 | Iwashita | H02P 23/0077 318/568.1 |
| 2014/0084838 | A1* | 3/2014 | Horiguchi | H02P 31/00 318/560 |
| 2014/0292250 | A1* | 10/2014 | Hirose | G05B 11/01 318/619 |
| 2014/0350709 | A1* | 11/2014 | Mochida | G05B 19/416 700/114 |
| 2015/0008861 | A1* | 1/2015 | Sonoda | G05B 13/04 318/504 |

FOREIGN PATENT DOCUMENTS

| | | |
|---|---|---|
| JP | H04-293107 A | 10/1992 |
| JP | H04-362702 A | 12/1992 |
| JP | 2004-321000 A | 11/2004 |
| JP | 2008-269349 A | 11/2008 |

\* cited by examiner

NUMERICAL CONTROLLER PERFORMING SPEED CONTROL THAT SUPPRESSES EXCESSIVE POSITIONING DEVIATION

RELATED APPLICATION DATA

This application claims priority under 35 U.S.C. § 119 and/or § 365 to Japanese Application No. 2015-30794 filed Feb. 19, 2015, the entire contents is incorporated herein by reference.

BACKGROUND OF THE INVENTION

1. Field of the Invention

The present invention relates to a numerical controller, and in particular, relates to a numerical controller performing speed control that suppresses excessive positioning deviation.

2. Description of the Related Art

During machining, there always arises a difference between a position command from a numerical controller controlling the machine and an actual position of a servo motor, which difference is referred to as a position deviation amount. When the position deviation amount exceeds a predefined allowable position deviation amount, the numerical controller generates a position deviation excess alarm and determines that the servo motor is in an abnormal state to shut the magnetization of the servo motor. Hence, the servo motor is thereby stopped without acceleration/deceleration.

In this case, the machine suffers shock due to the sudden stop of the servo motor. In the case of a gravitational axis, there is danger of its falling until a brake works. If it happens during the machining, the following problems would arise: a workpiece and/or a tool may be affected; recovery operation and/or determination of the cause may take time and extend the machining time; and so on. The allowable position deviation amount is determined by an operator using the following expression (1) and set to the numerical controller:

$$ERR = V \times (1-\alpha)/PG \qquad (1)$$

where, ERR is the allowable position deviation amount, V is a feed speed, PG is a position gain of a servo, and $\alpha$ is a feedforward coefficient.

The allowable position deviation amount ERR is typically calculated and set based on a feed speed of approximately 1.2 times the fastest speed of rapid traverse with the position gain PG of the servo and the feedforward coefficient $\alpha$ being fixed values. Otherwise, it may separately be configurable for cutting.

In practice, however, the position gain PG of the servo and the feedforward coefficient $\alpha$ may be switched for use depending on the purpose (movement command and the like) how the servo motor is operated, for example, in cutting feed, in rapid traverse, in synchronizing the main spindle with the servo motor, and the like. Conventional techniques for preventing such problems occurring when the position deviation excess alarm arises are disclosed in Japanese Patent Application Laid-Open No. 2004-321000 and Japanese Patent Application Laid-Open No. 04-293107.

Japanese Patent Application. Laid-Open No. 2004-321000 discloses a technology of servo motor control in which deviations are created between a position command, a speed command and the like and their feedbacks and a current command based on the deviations is clamped at a predetermined current restriction value.

On the other hand, Japanese Patent Application Laid-Open No. 04-293107 discloses a technology in which only when excessive load is exerted on a feed motor, an appropriate speed value is calculated from an actual position deviation amount, a theoretical position deviation amount and a servo loop gain to clamp the speed on the basis of the appropriate speed value.

In the conventional techniques as described above, when the actual position deviation amount which is the feedback of the servo motor exceeds a predefined allowable position deviation amount, the alarm is generated, clamping is performed at a speed not exceeding the allowable position deviation amount, or the deviations are created between the position command, the speed command and the like and their feedbacks to clamp the current command at a predetermined current restriction value as servo control.

The allowable position deviation amount is obtained from the speed, the loop gain of the servo and the feedforward coefficient using the expression (1) above. Since the speed, loop gain and feedforward coefficient may be changed depending on the movement command or the like, these may be changed in accordance with the movement command or the like. Moreover, when the movement commands having a different loop gain of the servo or a different feedforward coefficient, as would be found in the cutting feed and the rapid traverse, are overlapped, the loop gain of the servo and the feedforward coefficient may be switched during overlapping.

Moreover, in a function used for a press machine or the like, the loop gain of the servo may be varying depending on the position during the movement performed by one movement command. In such a case, the allowable position deviation amount with respect to the feed speed at that time cannot be correctly checked, and the position deviation excess alarm may arise incorrectly.

In addition, in either of the technology disclosed in Japanese Patent Application Laid-Open No. 2004-321000 and the technology disclosed in Japanese Patent Application Laid-Open No. 04-293107 above, the feedback values such as the position feedback and the actual position deviation amount are checked. Hence, time lag may arise in checking, and the position deviation amount which has been fed back may exceed the position deviation amount which is wanted to be checked. Moreover, the current command and the speed have to be changed so that a position deviation amount does not exceed the allowable position deviation amount, based on the fed-back position deviation amount. Hence, there is a problem that operation cannot be achieved at the acceleration/deceleration which is desired to be under control.

SUMMARY OF THE INVENTION

Therefore, an object of the present invention is to provide a numerical controller capable of executing a movement command at a speed not exceeding a feed speed which is given by a position deviation not exceeding a predefined allowable position deviation amount even when a position gain of a servo or a feedforward coefficient varies in executing the movement command.

A numerical controller according to the present invention controls a machine on the basis of a machining program, and includes: a program analysis unit that analyzes the machining program to generate command data; a parameter setting unit that sets a parameter actually used for servo control on the basis of the command data; and a speed control unit that obtains a feed speed which is given by a position deviation not exceeding a predefined allowable position deviation amount, on the basis of the set parameter and a predefined allowable position deviation amount, and when a feed speed commanded by the command data is larger than the obtained feed speed, clamps the feed speed commanded by the command data at the obtained feed speed.

The parameter may contain at least a position gain of a servo and a feedforward coefficient.

The speed control unit may obtain the feed speed which is given by a position deviation not exceeding the predefined allowable position deviation amount, as a maximum speed which satisfies the expression:

$$V \leq ERR \times PG/(1-\alpha)$$

where V is the feed speed which is given by a position deviation not exceeding the predefined allowable position deviation amount, ERR is the allowable position deviation amount, PG is a position gain of a servo, and $\alpha$ is a feedforward coefficient.

According to the numerical controller according to the present invention, a movement command can be executed at a speed not exceeding a feed speed which is given by a position deviation not exceeding a predefined allowable position deviation amount even when a position gain of a servo or a feedforward coefficient which is actually used varies in executing the movement command, enabling to suppress a position deviation amount excess alarm from arising in advance. Moreover, a movement command according to a set acceleration/deceleration value can be achieved.

BRIEF DESCRIPTION OF THE DRAWINGS

The aforementioned and other objects and features of the present invention will be apparent from the following description of embodiments with reference to the appended drawings, in which.

DETAILED DESCRIPTION OF THE PREFERRED EMBODIMENTS

In the present invention, a feed speed which is given by a position deviation not exceeding a predefined allowable position deviation amount is obtained based on a position gain of a servo actually used in a movement command, a feedforward coefficient actually used in the movement command, and the predefined allowable position deviation amount, in executing the movement command. Then, when a command speed in the movement command is larger than a feed speed which is given by a position deviation not exceeding the predefined allowable position deviation amount, the command speed is clamped at the feed speed which is given by a position deviation not exceeding the predefined allowable position deviation amount to execute the movement command. Moreover, by performing the clamping of the command speed before performing acceleration/deceleration, operation at a set acceleration/deceleration can be achieved.

Figure 1:
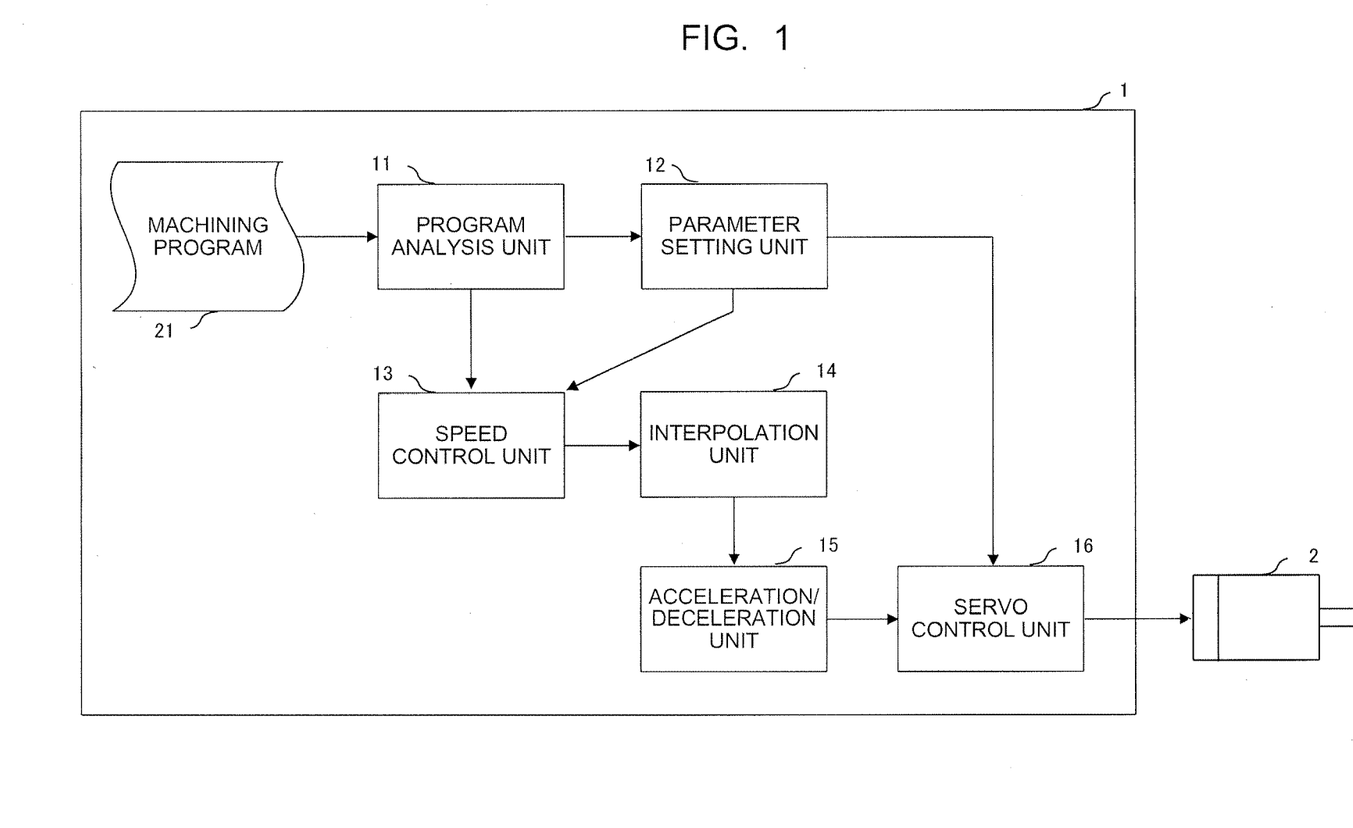
FIG. 1 is a functional block diagram of a numerical controller according to a first embodiment of the present invention.
Figure 2:
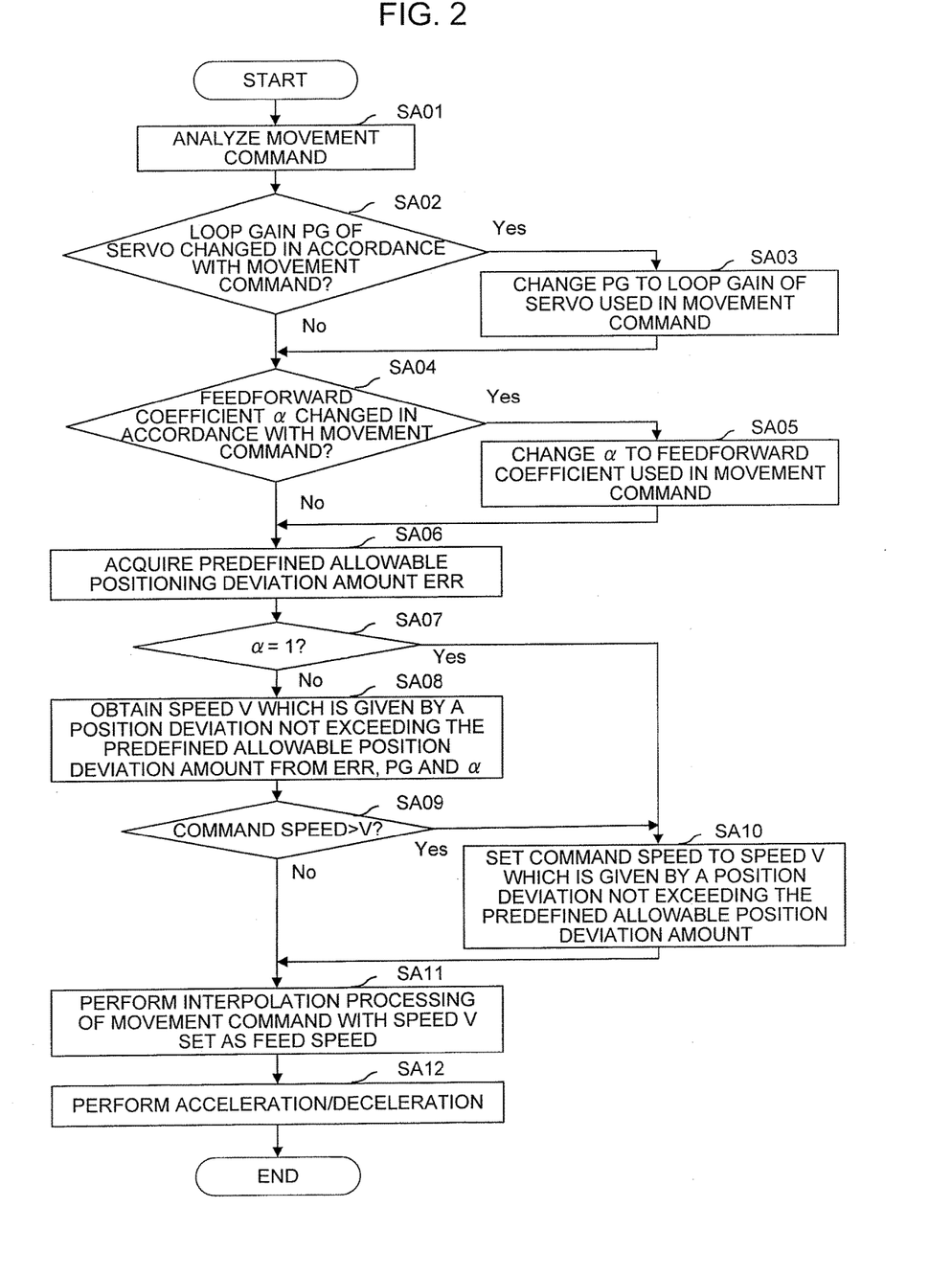
FIG. 2 is a flowchart illustrating a flow of processing performed on the numerical controller in FIG. 1.

First, a numerical controller according to a first embodiment of the present invention is described using FIG. 1 and FIG. 2.

As illustrated in FIG. 1, a numerical controller 1 according to the embodiment includes a program analysis unit 11, a parameter setting unit 12, a speed control unit 13, an interpolation unit 14, an acceleration/deceleration unit 15 and a servo control unit 16.

The program analysis unit 11 reads and analyzes a command block from a machining program 21 stored in a memory (not shown), and generates and outputs command data.

The parameter setting unit 12 determines whether or not a loop gain PG of a servo and a feedforward coefficient $\alpha$ are needed to be changed in accordance with a movement command commanded by the command data, on the basis of the command data output by the program analysis unit 11. When needed to be changed, the parameter setting unit 12 changes the loop gain PG of the servo and the feedforward coefficient $\alpha$.

The speed control unit 13 calculates a speed V which is given by a position deviation not exceeding the predefined allowable position deviation amount ERR, using the expression (2) below, on the basis of the loop gain (position gain of the servo) PG and the feedforward coefficient $\alpha$ which are set by the parameter setting unit 12 and actually used in the movement command commanded by the command data, and the allowable position deviation amount ERR which is predefined.

$$V \leq ERR \times PG/(1-\alpha) \quad (2)$$

Then, the speed control unit 13 compares the calculated speed V with a command speed in the movement command commanded by the command data. When the command speed is larger than the speed V, the speed control unit 13 changes (clamps) the feed speed in the movement command commanded by the command data so as to be V.

The interpolation unit 14 generates data obtained by performing interpolation calculation of points on a command path for an interpolation period on the basis of the movement command commanded by the command data and the speed determined by the speed control unit 13.

The acceleration/deceleration unit 15 performs acceleration/deceleration processing on the basis of the interpolation data output by the interpolation unit 14 to calculate the speed of each drive axis for each interpolation period, and outputs the calculated speed data to the servo control unit 16.

Then, the servo control unit 16 controls a servo motor 2 on the basis of the output of the acceleration/deceleration unit 15 and the parameters such as the loop gain PG of the servo and the feedforward coefficient $\alpha$ which are set by the parameter setting unit 12.

FIG. 2 is a flowchart illustrating a flow of processing performed for each control cycle of the numerical controller 1 on the numerical controller 1 in FIG. 1. The processing is explained below according to respective steps

[Step SA01] The program analysis unit 11 reads and analyzes the command block from the machining program 21 and generates the command data.

[Step SA02] The parameter setting unit 12 determines, based on the command data generated in step SA01, whether or not the loop gain PG of the servo is needed to be changed in accordance with the movement command commanded by the command data. When the loop gain PG is needed to be changed, the process proceeds to step SA03, and when not needed, the loop gain PG is set to the servo control unit 16 and the process proceeds to step SA04.

[Step SA03] The parameter setting unit 12 changes the loop gain PG to a loop gain of the servo used in the movement command and sets the changed loop gain PG to the servo control unit 16.

[Step SA04] The parameter setting unit 12 determines, based on the command data generated in step SA01, whether or not the feedforward coefficient α is needed to be changed in accordance with the movement command commanded by the command data. When the feedforward coefficient α is needed to be changed, the process proceeds to step SA05, and when not needed to be changed, the feedforward coefficient α is set to the servo control unit 16 and the process proceeds to step SA06.

[Step SA05] The parameter setting unit 12 changes the feedforward coefficient α to a feedforward coefficient used in the movement command to set it to the servo control unit 16.

[Step SA06] The speed control unit 13 acquires the predefined allowable position deviation amount ERR and sets it to the servo control unit 16.

[Step SA07] The speed control unit 13 determines whether or not the feedforward coefficient α used in the movement command commanded by the command data is 1. When the feedforward coefficient α is 1, the process proceeds to step SA10, and otherwise, the process proceeds to step SA08.

[Step SA08] The speed control unit 13 calculates, based on the allowable position deviation amount ERR set in step SA06, and the loop gain PG and the feedforward coefficient α which are used in the movement command commanded by the command data, the speed which is given by a position deviation not exceeding the predefined allowable position deviation amount, by using the expression (2) above. The calculated speed is set as V.

[Step SA09] The speed control unit 13 determines whether or not the command speed in the movement command commanded by the command data is larger than the speed V calculated in step SA08. When larger than the calculated speed V, the process proceeds to step SA10, and otherwise, the process proceeds to step SA11.

[Step SA10] The speed control unit 13 determines the command speed in the movement command commanded by the command data as the speed V.

[Step SA11] The interpolation unit 14 performs the interpolation processing on the basis of the movement command commanded by the command data and the speed V defined by the speed control unit 13, and creates the interpolation data.

[Step SA12] The acceleration/deceleration unit 15 performs the acceleration/deceleration processing on the basis of the interpolation data created in step SA11, and outputs the result data to the servo control unit 16.

The basic configuration and processing flow in the numerical controller of the present invention have been described so far. Hereafter, more specific embodiments in the numerical controller of the present invention are presented.

Figure 3:
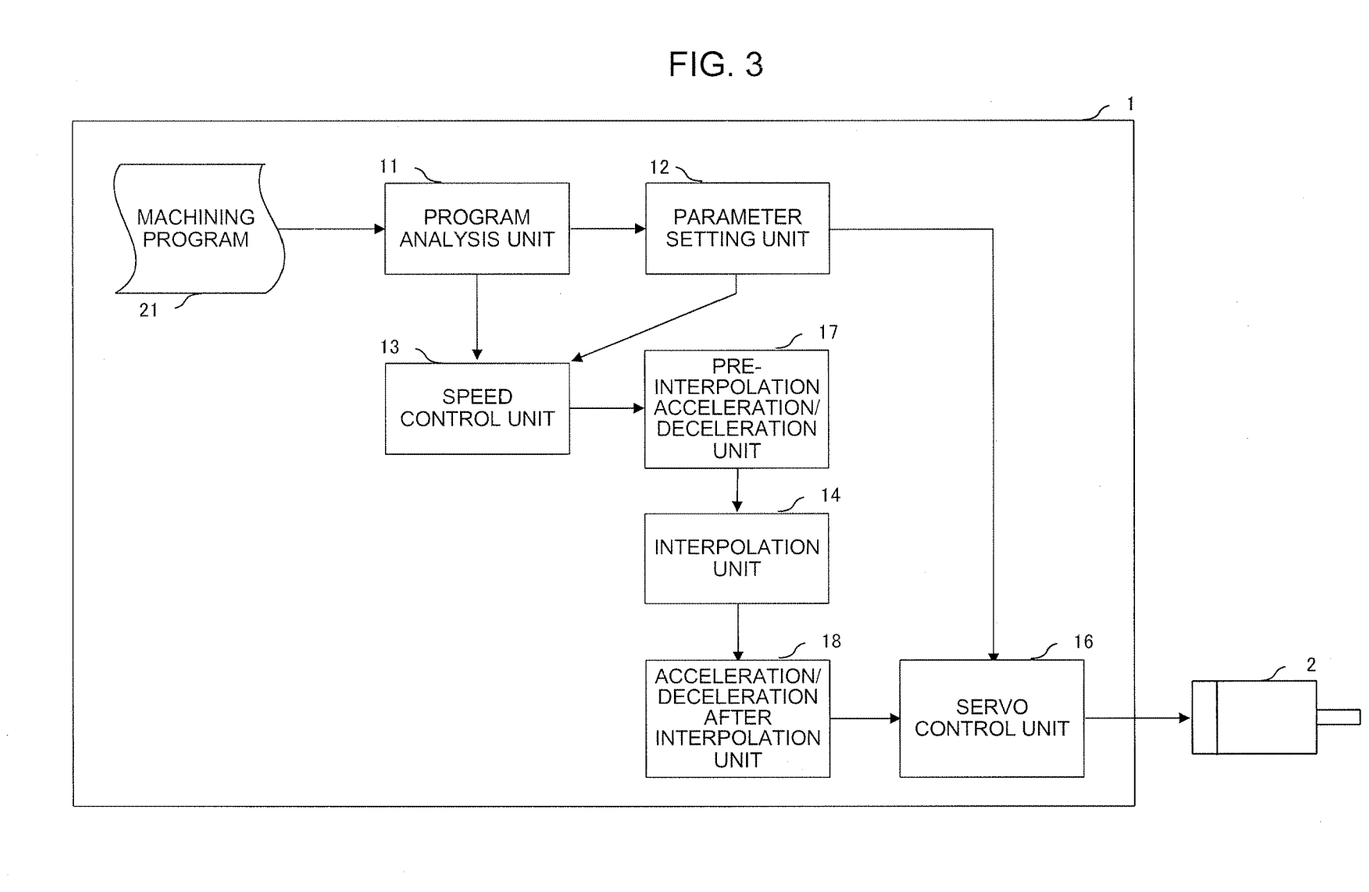
FIG. 3 is a functional block diagram of a numerical controller according to a second embodiment of the present invention.
Figure 4:
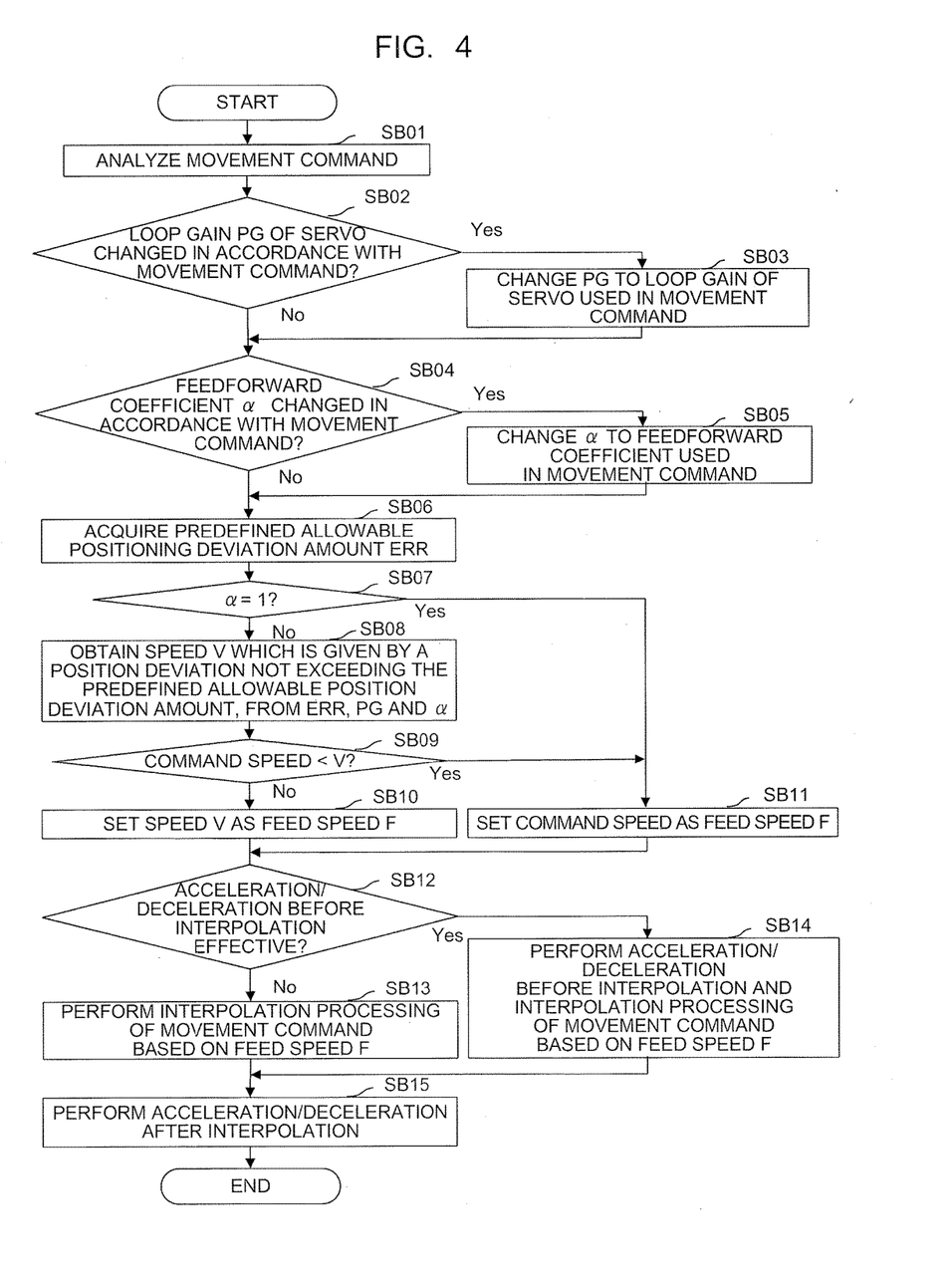
FIG. 4 is a flowchart illustrating a flow of processing performed on the numerical controller in FIG. 3.

A numerical controller according to a second embodiment of the present invention is described using FIG. 3 and FIG. 4.

The numerical controller 1 according to the present embodiment is configured to perform acceleration/deceleration before interpolation and acceleration/deceleration after interpolation and includes an acceleration/deceleration before interpolation unit 17 and an acceleration/deceleration after interpolation unit 18 as illustrated in FIG. 3, in place of the acceleration/deceleration unit 15 of the numerical controller 1 in the first embodiment (FIG. 1).

Functions of individual elements constituting this numerical controller 1 illustrated in FIG. 3 are similar to the functions of the corresponding elements in the numerical controller 1 illustrated in FIG. 1 except for those of the interpolation unit 14, the acceleration/deceleration before interpolation unit 17 and the acceleration/deceleration after interpolation unit 18.

When the acceleration/deceleration before interpolation is enabled, the acceleration/deceleration before interpolation unit 17 performs the acceleration/deceleration before interpolation processing on the basis of the movement command commanded by the command data and the speed defined by the speed control unit 13, and outputs the result data to the interpolation unit 14.

The interpolation unit 14 generates data obtained by interpolation of the points on the command path for the interpolation period, on the basis of the result data output by the acceleration/deceleration before interpolation unit 17 in the case where the acceleration/deceleration before interpolation is enabled, or on the basis of the movement command commanded by the command data and the speed defined by the speed control unit 13 in the case where the acceleration/deceleration before interpolation is disabled.

Then, when the acceleration/deceleration after interpolation is enabled, the acceleration/deceleration after interpolation unit 18 performs the acceleration/deceleration after interpolation processing on the basis of the interpolation data output by the interpolation unit 14 to calculate the speed of each drive axis for each interpolation period, and outputs the result data to the servo control unit 16. When the acceleration/deceleration after interpolation is disabled, the output of the interpolation unit 14 is output to the servo control unit 16.

FIG. 4 is a flowchart illustrating a flow of processing performed for each control cycle of the numerical controller 1 on the numerical controller 1 in FIG. 3. In this processing, it is assumed that the acceleration/deceleration after interpolation processing is enabled at all times.

Since processes in step SB01 to step SB06 in this flowchart of FIG. 4 are similar to the processes in step SA01 to step SA06 in the flowchart of FIG. 2, their description is omitted here. Then, processes in step SB07 to step SB15 are hereafter described.

[Step SB07] The speed control unit 13 determines whether or not the feedforward coefficient α used in the movement command commanded by the command data is 1. When the feedforward coefficient α is 1, the process proceeds to step SB11, and otherwise, the process proceeds to step SB08.

[Step SB08] The speed control unit 13 calculates, based on the allowable position deviation amount ERR set in step SB06 and the loop gain PG and the feedforward coefficient α which are used in the movement command commanded by the command data, the speed which is given by a position deviation not exceeding the predefined allowable position deviation amount, by using the expression (2) above. The calculated speed is set as the speed V.

[Step SB09] The speed control unit 13 determines whether or not the command speed in the movement command commanded by the command data is smaller than the speed V calculated in step SB08. When being smaller than the calculated speed V, the process proceeds to step SB11, and otherwise, the process proceeds to step SB10.

[Step SB10] The speed control unit 13 defines the speed V calculated in step SB08 as the feed speed F.

[Step SB11] The speed control unit 13 defines the command speed in the movement command commanded by the command data as the feed speed F.

[Step SB12] It is determined whether or not the acceleration/deceleration before interpolation is enabled. When enabled, the process proceeds to step SB14, and otherwise, the process proceeds to step SB13.

[Step SB13] The interpolation unit 14 performs, based on the movement command commanded by the command data and the speed defined by the speed control unit 13, the interpolation processing to generate the interpolation data. The process proceeds to step SB15.

[Step SB14] The acceleration/deceleration before interpolation unit 17 performs, based on the movement command commanded by the command data and the speed defined by the speed control unit 13, the acceleration/deceleration before interpolation processing. The interpolation unit 14 performs, based on the result data of the acceleration/deceleration before interpolation processing, the interpolation processing and generates the interpolation data.

[Step SB15] The acceleration/deceleration after interpolation unit 18 performs, based on the generated interpolation data, the acceleration/deceleration after interpolation processing and outputs the result data to the servo control unit 16.

A numerical controller according to a third embodiment of the present invention is described.

The numerical controller 1 according to the present embodiment performs control in which movement commands different in loop gain of the servo and in feedforward coefficient, such as cutting feed and rapid traverse, overlap.

When a movement command of the cutting feed and a movement command of the rapid traverse overlap, loop gains of the servo and/or feedforward coefficients are switched in switchover between the cutting feed and the rapid traverse, during movement in the overlapping.

In the numerical controller of the present embodiment, even before and after loop gains of the servo and/or feedforward coefficients are switched in the switchover, on the basis of the position gain of the servo and the feedforward coefficient which are actually used and the predefined allowable position deviation amount, the feed speed which is given by a position deviation not exceeding the predefined allowable position deviation amount is sequentially obtained. When the feed speed to be output is larger than the speed which is given by a position deviation not exceeding the predefined allowable position deviation amount, the speed obtained by clamping at the speed which is given by a position deviation not exceeding the predefined allowable position deviation amount is set as the feed speed. Then, similarly to the aforementioned numerical controller according to the first embodiment, the speed control processing, the acceleration/deceleration processing and the interpolation processing are performed.

As described above, in the present embodiment, in the case where a movement command of the cutting feed and a movement command of the rapid traverse overlap, even when loop gains of the servo and/or feedforward coefficients are switched during a movement in overlapping, the speed which is given by a position deviation not exceeding the predefined allowable position deviation amount is sequentially calculated. Further, the speed is controlled based on the calculated speed. Hence, the position deviation amount excess alarm can be beforehand suppressed from arising. Moreover, the movement command according to the set acceleration/deceleration value can be achieved.

A numerical controller according to a fourth embodiment of the present invention is described.

The numerical controller 1 according to the present embodiment performs control in which the loop gain of the servo is varying with the position of the servo motor during the movement performed by one movement command, and is mainly applied to control of a press machine and the like.

In the numerical controller according to the present embodiment, based on the loop gain of the servo which is actually used and is varying with the position, the feedforward coefficient actually used, and the predefined allowable position deviation amount, the feed speed which is given by a position deviation not exceeding the predefined allowable position deviation amount is sequentially obtained. When the feed speed to be output is larger than the speed which is given by a position deviation not exceeding the predefined allowable position deviation amount, the speed obtained by clamping at the speed which is given by a position deviation not exceeding the predefined allowable position deviation amount is set as the feed speed. Then, similarly to the numerical controller according to the first embodiment, the speed control processing, the acceleration/deceleration processing and the interpolation processing are performed.

As described above, in the present embodiment, even when as in a function used in a press machine and the like, the loop gain of the servo is varying with the position of the servo motor during the movement performed by one movement command, the speed which is given by a position deviation not exceeding the predefined allowable position deviation amount is sequentially obtained. As the speed is controlled based on that calculated speed, the position deviation amount excess alarm can be beforehand suppressed from arising and the movement command according to the set acceleration/deceleration value can be achieved.

As described above, the embodiments of the present invention have been described. The present invention is not limited to the examples in the aforementioned embodiments but can be implemented in various modes with proper modifications added thereto.

What is claimed is:

1. A numerical controller which controls a machine on the basis of a machining program, the numerical controller comprising:
  a program analysis unit that analyzes the machining program to generate command data;
  a parameter setting unit that sets a parameter actually used for servo control on the basis of the command data;
  a servo control unit that controls a servo motor; and
  a speed control unit that obtains a feed speed which is given by a position deviation not exceeding an actually used allowable position deviation amount on the basis of an allowable position deviation amount calculated based on the parameter actually used for servo control, the set parameter, and a predefined allowable position deviation amount, wherein
  when a feed speed commanded by the command data is larger than the obtained feed speed, the speed control unit is configured to clamp the feed speed commanded by the command data to be equal to the obtained feed speed, wherein the servo control unit controls the servo motor based on the feed speed commanded by the command data, and wherein the speed control unit obtains the feed speed which is given by a position deviation not exceeding the actually used allowable position deviation amount, as a maximum speed which satisfies the expression:

$$V \leq ERR \times PG/(1-\alpha)$$

where V is the feed speed which is given by a position deviation not exceeding the actually used allowable position deviation amount, ERR is the allowable position deviation amount, PG is a position gain of a servo, and $\alpha$ is a feedforward coefficient.

* * * * *